United States Patent [19]
Xue

[11] Patent Number: 5,928,812
[45] Date of Patent: Jul. 27, 1999

[54] HIGH PERFORMANCE LITHIUM ION POLYMER CELLS AND BATTERIES

[75] Inventor: Jiayu Simon Xue, Fairport, N.Y.

[73] Assignee: UltraLife Batteries, Inc., Newark, N.Y.

[21] Appl. No.: 08/929,486

[22] Filed: Sep. 15, 1997

Related U.S. Application Data

[60] Provisional application No. 60/031,174, Nov. 18, 1996.
[51] Int. Cl.[6] .................................................. H01M 10/08
[52] U.S. Cl. ...................... 429/304; 429/231.95; 429/306
[58] Field of Search ................................ 429/137, 231.95

[56] References Cited

U.S. PATENT DOCUMENTS 4,215,188  7/1980  Saathoff et al. ........................ 429/194
5,705,291  1/1998  Amatucci et al. ....................... 429/137

*Primary Examiner*—Maria Nuzzolillo
*Assistant Examiner*—Angela J. Martin
*Attorney, Agent, or Firm*—Graham & James LLP

[57] ABSTRACT

Cells, especially solid state rechargeable lithium ion-containing cells having significantly improved cell shelf-life, cycle life and reduced impedance growth. A non-cathode active lithium compound containing one or more non-metallic elements, such as $Li_2CO_3$ and $Li_2B_4O_7$, substantially insoluble in the non-aqueous electrolyte of the cell, is dispersed throughout the cathode and is further dispersed within at least one of the anode and separator.

16 Claims, 15 Drawing Sheets

HIGH PERFORMANCE LITHIUM ION POLYMER CELLS AND BATTERIES

This application claims benefit of Provisional Application 60/031,174 filed Nov. 18, 1996.

FIELD OF THE INVENTION

The present invention relates to enhancement of discharge capacity, recycling capability and high temperature storage stability of electrochemical cells and particularly of rechargeable lithium ion polymer cells and batteries.

BACKGROUND OF THE INVENTION

Lithium ion cells generally utilize two different insertion compounds as host cathode and anode materials, i.e., intercalation materials, for the reversible insertion of guest ions (e.g. lithium ions, or other alkaline metal ions) in providing the electrochemical reactions for generation of an electrical current. During discharge of a lithium ion cell, lithium ions are extracted from the lithium ion containing anode material and are ionically transported through the electrolyte/separator into the cathode, with generation of an external electrical current. The reverse process occurs on charging of the cell with reversal of ion flow.

Lithium ion cells may either be conventional liquid electrolyte based cells, i.e., with free liquids, generally of a non-aqueous organic nature, or can be "solid state" cells having a polymeric porous matrix in which the electrolyte is immobilized. The polymeric matrix comprises a porous separator between anode and cathode to permit the requisite ionic transport between anode and cathode. In a solid state rechargeable, or "secondary" cell system, lithium (or other electrochemically active metal) is shuttled back and forth between the cathode and anode in the form of ions dissolved in the non-aqueous electrolyte (whether free or immobilized in a polymeric matrix).

Because of electrolyte immobilization in polymer cells, a necessary function of cell construction, safety and dimensional flexibility; there is a reduction in ion transport rate. This may result in deterioration in both cell discharge capability and recycling efficiency, particularly under conditions of use after elevated temperature storage conditions.

Various expedients have been utilized, particularly in the form of electronic and ion transport enhancing additives and stabilizers being included in the various cell components and particularly the anode and electrolyte. However, these expedients have been only minimally effective. It is believed that other factors, aside from ionic and electronic conductivity are involved in deterioration of cell performance which the prior art expedients have not effectively addressed.

SUMMARY OF THE INVENTION

The present invention comprises improving the cycle life, discharge capability, and high temperature storage stability of rechargeable non-aqueous and "solid state" (defined herein as referring to cells with immobilized non-aqueous electrolytes) lithium ion cells, by addition of substantial amounts of substantially insoluble or sparingly soluble lithium compounds (solubility of less than $10^{-2}$ gm/l, in the electrolyte solvents). These substantially insoluble lithium compounds include lithium salts, lithium oxides and lithium compounds containing oxygen and third elements. Generally the substantially insoluble lithium-containing compounds of the present invention are those compounds which are comprised of lithium and one or more non-metallic elements (i.e., no metallic elements other than lithium). The substantially insoluble lithium compounds are added to the cell cathode and optionally to the anode and separator, where there appears to be an interaction between the substantially insoluble lithium compound and the materials of the cathode, in-situ or ex situ through the anode and separator.

The substantially insoluble lithium compounds of the present invention are not electrochemically active or capable of functioning as ion host materials. Accordingly, their volume presence actually reduces the amount of reaction sites and/or active material in the cell. However, unexpectedly, cell discharge capability is measurably enhanced, cycle life is significantly improved at both room and elevated temperatures, and high temperature storage stability is also enhanced.

In order to provide the requisite effect, the substantially insoluble lithium compounds are generally dispersed throughout the cathode (and optionally in either or both of the separator and anode) and are not concentrated at the electrode-separator interface, as would normally be the case with ionic conductivity enhancers. The lithium compounds are accordingly comminuted to an extent whereby they are readily dispersible within the cathode and anode as well as the separator with the substantially insoluble lithium compounds generally being mixed together with the other component materials of the cathode, anode and separator.

It is theorized, though the present application is not limited to such theory, that the substantially insoluble lithium compound, as a function of its insolubility, improves the stability and reduces solubility of the intercalating cathode material. This appears to stabilize the secondary cell characteristics but also beneficially, without significant concomitant detrimental reduction of primary cell performance and capacity, which would otherwise have been expected.

In a still further embodiment, the present invention relates to the incorporation of the substantially insoluble lithium-containing compound into the cathode material, and into either or both the anode and separator materials of rechargeable lithium ion-containing cell. Since there is reversible material transfer in the rechargeable cells, the substantially insoluble lithium compounds appear to stabilize the solid electrolyte interphase of the anode. The stabilizing effect of addition of the substantially insoluble lithium containing compound is however primarily with respect to the primary cathode materials. Inclusion of the substantially insoluble compounds in the electrolyte solution itself is impractical because of their defined insolubility (they would only precipitate from a suspension in the electrolyte solution). However, the substantially insoluble compounds may be added to the separator if they are thereby trapped in a position where they are exposed to the pathway of transportation and/or are directly juxtaposed with the anode and cathode materials. Again, the inclusion of the substantially insoluble lithium compounds in the separator is secondary in effect relative to the same inclusions in the cathode and is generally in a form therein of a stabilizing material supply site.

The above features and advantages of the present invention will be more clearly seen from the following discussion and drawings in which:

SHORT DESCRIPTION OF THE DRAWINGS

FIG. 1 is a graph of the discharge capabilities of polymer lithium ion cells having a substantially insoluble lithium compound ($Li_2CO_3$) dispersed in the anode, separator and cathode, after two room temperature storage periods of two weeks each. Data of 72 groups (about 40 cells per group) for standard cells (without substantially insoluble lithium compound inclusions) is also shown for comparison purposes.

FIG. 2 is a graph of the discharge capabilities of polymer lithium ion cells having a substantially insoluble lithium compound ($Li_2CO_3$) dispersed in the anode, separator and cathode, after two 45° C. storage periods of two weeks each. Data of 72 groups (about 40 cells per group) for standard cells (without substantially insoluble lithium compound inclusion) is also shown for comparison purposes.

FIG. 3 is a graph of the impedance growth of polymer lithium ion cells having a substantially insoluble lithium compound ($Li_2CO_3$) dispersed in the anode, separator and cathode after two room temperature and 45° C. storage periods of two weeks each. Data of 72 groups (about 40 cells per group) for standard cells (without substantially insoluble lithium compound inclusion) is also shown for comparison purposes.

FIGS. 11a–d are graphs showing comparative values (capacity and impedance) of cells having amounts of the substantially insoluble lithium compounds of $Li_2CO_3$, $Li_2B_4O_7$, $Li_3PO_4$, and LiF (in the separators thereof) under discharge conditions after room and high temperature storage (FIGS. 11a and 11b) and with 1 kHz impedance after room and high temperature storage (11c and 11d) respectively.

Figure 12:
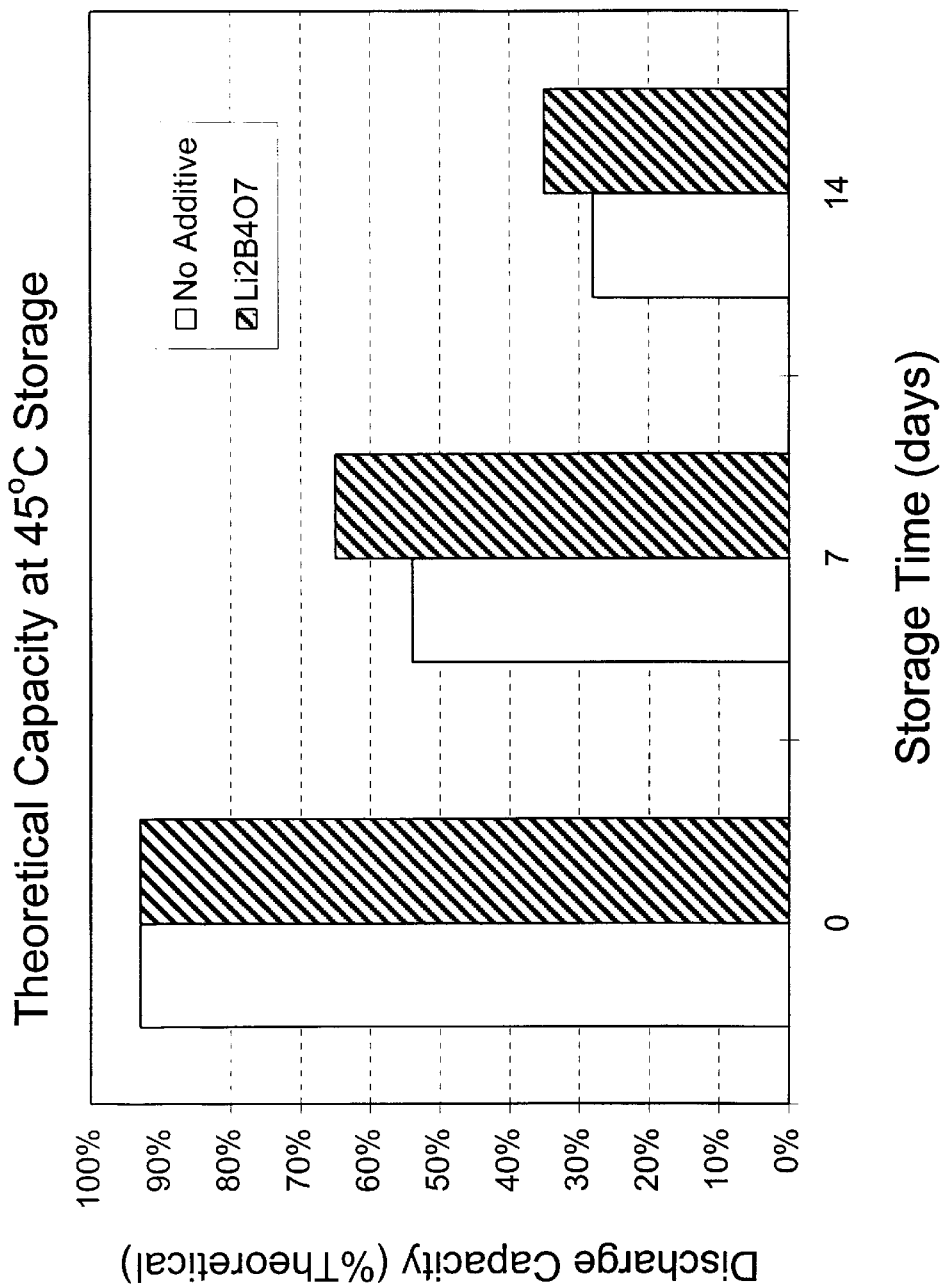

FIG. 12 is a comparative graph showing discharge capacity initially and after high temperature storage (45° C.) of 7 and 14 days, for standard lithium ion cells and cells with $Li_2B_4O_7$ inclusions in the cathodes.

DETAILED DESCRIPTION OF THE INVENTION AND THE PREFERRED EMBODIMENTS

It has been discovered that with incorporation, by dispersal, of significant amounts of substantially insoluble lithium compounds comprised of lithium and nonmetallic elements and particularly compounds containing oxygen and third component non-metallic elements, such as lithium carbonate ($Li_2CO_3$), directly into ion intercalating cathodes (and optionally into anode and separator materials) of lithium-ion cells, there is an unexpected significant improvement of cell discharge capability and cycle life even under elevated temperature conditions and after extended periods of elevated storage conditions. In accordance with the present invention, the term "substantially insoluble lithium compounds" as used herein refers to non-electrode active (neither as host or discharge materials) lithium-containing compounds without other metals (e.g., salts, oxides and oxygen containing compounds) which are insoluble or substantially insoluble in non-aqueous electrolyte solvents used in the cell, such as those including acetone, alcohol, and various carbonate solvents, etc. Substantial insolubility is defined herein as being less than $10^{-2}$ gm/l.

Solid state lithium ion polymer cells (components and methods of manufacture) are well-known in the prior art. See for example, U.S. Pat. Nos. 5,460,904; 5,456,000; 5,296,318; 5,478,668 and 5,429,891, for descriptions of rechargeable lithium ion polymer cells, the entire contents of which are incorporated by reference herein. One particularly preferred type of prior art polymer electrolyte cell utilizes a plasticized thermoplastic polymer as a binder for each of the anode, cathode and separator. In such cell, the individual layers are each produced from a slurry comprised of a mixture of the substituent (anode, cathode or separator) component comminuted into a powder and one or more organic solvents. The mixtures may include plasticizer fillers and volatile solvents to remove the plasticizer for imparting porosity to the particular component. A single cell assembly is made simply by applying heat and pressure to fuse the juxtaposed component layers together (anode and cathode layers with separator therebetween). The plasticizer is solvent extracted from the cell to create microporous matrices into which an ionically conductive non-aqueous liquid electrolyte is backfilled. The entire cell pack may be encapsulated in an insulated package with appropriate exposed terminal connections. The cells are stacked and connected either in series or parallel to form batteries of desired voltages and discharge capability.

The binding polymer used in the electrodes and separator elements is preferably a thermoplastic polymer and may be any suitable copolymer, but is preferably and commonly, in commercial cells, a copolymer of poly(vinylidene fluoride)-hexafluoropropylene (or PVdF-HFP). Since no free electrolyte exists in the solid state polymer lithium ion cell system, it is considered to be safer than its liquid electrolyte analog.

Polymer Cell construction and components:

In a polymer type cell the cathode and anode are applied to opposite sides of the solid polymer electrolyte separator and respective electrically conductive current collectors are placed adjacent the anodes and cathodes. The anode, cathode, current collectors and separator together comprise the individual cell assembly which is placed into a metallized plastic laminate which is sealed under heat and pressure to form a completed sealed cell, with the respective current collectors remaining electrically externally accessible.

The cell anode, cathode and separator are each preferably comprised of a combination of a poly(vinylidene fluoride) copolymer matrix and a compatible organic plasticizer which maintains a homogeneous composition in the form of a self-supporting film. In commercial embodiments, the separator copolymer composition comprises from about 75 to about 92% by weight poly(vinylidene fluoride) (PVdF) and about 8 to about 25% by weight hexafluoropropylene (HFP), (both commercially available from Elf AtoChem North America as Kynar FLEX™), and an organic plasticizer. The copolymer composition is also used as binder material in the manufacture of the respective electrodes to insure a compatible interface with the separator. Particularly preferred are the higher-boiling point plasticizers such as dibutyl phthalate, dimethyl phthalate, diethyl phthalate and tris butoxyethyl phosphate. In addition, inorganic fillers may be added to enhance the physical strength and melt viscosity of the separator membrane, and to increase the electrolyte solution absorption level. Preferred fillers include fumed alumina and silanized fumed silica.

Any common procedure for casting or forming films or membranes of polymer compositions may be used to make the separator. A readily evaporated casting solvent may be added to obtain desired viscosity during casting. The preferred anodes of the present invention are made by preparing a slurry of PVDF-HFP and acetone along with the dibutylphthalate (DBP). To this mixture is added the ion intercalation or host material, generally of a carbon material such as a pitch coke, or graphitic composition, most preferably mesocarbon micro beads (MCMB, Osaka Gas, Osaka, Japan), with carbon black being added to further facilitate electrical conductivity.

The cathode preferably is prepared in a fashion similar to the anode. However, an amount of lithium manganese oxide is added to the mix in place of the graphite as the host intercalation material for the lithium ions.

To facilitate ionic conductivity and transport, the anode, cathode and separator are made porous by solvent extraction of the plasticizer material such as DBP, which, after the extraction, leaves matrices or pores in the electrodes and separator. The porous electrodes are dipped into the electrolyte, in order to load the electrolyte into the cell.

The current collectors which are assembled to be in intimate electrical contact with the cathode and the anode are preferably made from aluminum and copper, respectively, and may be foil or grid-like in configuration.

The electrolyte comprises a solution of a soluble lithium salt in one or more organic solvents such as ethylene carbonate and dimethyl carbonate (EC-DMC). Other commonly utilized non-aqueous solvents include γ-butyrolactone (γ-BL), tetrahydrofuran (THF), 1,2-dimethoxyethane (1,2-DME), propylene carbonate (PC), diethyl carbonate (DEC), methyl ethyl carbonate (MEC), diethoxyethane (DEE), dioxolane (DOL) and methyl formate (MF).

Generally the soluble electrolyte is present in about 1 to 2 molar solutions and with preferred and common soluble electrolyte lithium salts being $LiPF_6$, $LiAsF_6$, $LiBF_4$, $LiClO_4$, $LiCF_3SO_3$, $LiN(CF_3SO_2)_3$, and $LiN(C_2F_5SO_2)_3$, with $LiPF_6$ being particularly preferred. The absolute amount of electyrolyte salt in the cell is, of course, generally dependent on the cell size, type and desired discharge capability.

As described in various prior art publications, e.g., J. Electrochemical Soc., Vol. 143: No. 1, pp 6–12 (January 1996) and No. 12, pp 3809–3820 (December 1996); and Japanese No.: Heisei 7-235,297 published Sep. 5, 1995, organic solvents are characterized as generally containing water impurities which tend to react, albeit in small amounts with the electrolyte salts (and particularly halogen containing salts) to form acids such as HF, as may occur with use of fluorine containing salts such as $LiPF_6$. These acids, though present in small amounts, have been shown in the aforementioned references, to detrimentally affect cycle life and discharge capability of cells and particularly of fluoropolymer cells, by reaction at the separator-anode interface. Accordingly, small amounts of scavenging materials such as $Li_2CO_3$ have been added directly to electrolyte solutions of cells (the site of the acid source), the separators and to the anodes of the cells (the site of the detrimental reaction of the acids), in order to neutralize the acids, such as HF, by reaction therewith. Such additions are however very small in order to only scavenge the small amounts of acids. Larger amounts of scavenging material added to the electrolyte (i.e., in excess of the amount of the actual electrolyte salt which is the source of a component of the acid production) are not only unnecessary and precipitable, but have also been characterized in the prior art as being detrimental to cell operation. In addition, the scavenging material is located in the cells in a site specific manner, in order to facilitate the effect of such scavenging process, i.e., in the electrolyte or separator containing the electrolyte or in the anode, to control the interface between the anode and separator, where the detrimental effects of HF are greatest.

In contrast, in accordance with the present invention, "excessive amounts" of the substantially insoluble lithium compounds are added primarily to the cathode material and only optionally to also either or both of the anode and separator. Thus, while there may be some scavenging effect, as described in the prior art, the additional amounts of the substantially insoluble lithium compounds, well in excess of that required for the scavenging, and the direct placement of the lithium compounds primarily in the cathode materials, there is an unexpectedly marked enhancement in cell recycling properties and capability which cannot be attributed to a scavenging effect.

In addition, while the detrimental effects of "excessive" $Li_2CO_3$, described in the prior art occur with respect to cells having certain cathodes such as those containing $LiCO_2$, cathodes containing manganese such as the $Li_{1+x}Mn_{2-x}O_4$, which is utilized in the present invention, not only are not detrimentally affected but the performance thereof has been discovered to be markedly enhanced.

Since the substantially insoluble lithium compounds of the present invention are present in the electrodes and separator in amounts (by weight or total moles) on the order of or greater than that of the cell electrolyte salt (the source of the HF) there is no discernible function of the substantially insoluble lithium compounds in such greater amounts. In fact, the lithium compounds of the present invention are substantially insoluble (by definition) they do not function as ionically conducting salts and absent the present invention would be considered to be a waste of volumetric capacity.

In addition, in accordance with the present invention one or more substantially insoluble lithium-containing compounds, e.g., lithium salts, oxides, and oxygen containing compounds with third non-metallic elements, are added to and dispersed in the cell cathode and optionally also dispersed into the anode and/or separator. Because of such placement, primarily in the cell cathode, there is minimal scavenger effect as described in the prior art with use of substantially insoluble lithium compounds such as $Li_2CO_3$ and thus, absent the present invention, no perceived utility in the art for inclusion of substantially insoluble, non electrode active lithium compounds in the cell electrodes and separator. There is however an unexpected benefit, as described, particularly with respect to cells having manganese containing cathodes, in the form of unexpectedly improved cell performance with improved cycling life efficiency (number of charge/discharge cycles for which the cell can deliver more than 70% of its initial discharge capacity), reduction of impedance growth rate on high temperature storage or use and extension of shelf life at high temperature.

The preferred substantially insoluble lithium-containing compounds with non-metallic elements, of the present invention include $Li_2CO_3$, $Li_2B_4O_7$, and $Li_3PO_4$. Other substantially insoluble lithium compounds include $Li_2C_2O_4$, $LiB_3O_5$, $LiB_8O_{13}$, $LiBO_2$, $Li_4B_2O_5$, $Li_3BO_3$, $Li_2B_2O_4$, $Li_2B_6O_{10}$, $LiPO_3$, $Li_4P_2O_7$, $LiP$, $Li_3P$, $Li_3N$, $Li_2O$, $LiSiO_3$, $Li_4SiO_4$, $Li_2Si_3O_7$, $Li_2Si_2O_5$, $Li_{13}Si_4$, $Li_{21}Si_8$, $Li_2SeO_4$, $Li_2Se$, $Li_2SO_3$, $Li_2SO_4$, $Li_2S_2O_6$, $Li_2S_2O_4$ and the halides of LiF, LiBr, LiCl and LiI. The most preferred substantially insoluble lithium compound is $Li_2CO_3$. It is understood that these lithium compounds specifically do not include intercalation materials such as carbonaceous materials (e.g. $LiC_6$), or lithium with metallic elements such as the $Li_{1+x}Mn_2O_4$, which is used as a common host cathode material in lithium ion polymer cells.

Other lithium intercalation compounds used as cathode materials include manganese oxide compounds such as $LiMn_2O_4$, $LiMnO_2$, as well as various cobalt and nickel compounds. Anode materials include $Li_xC_6$ ($x=1_{13}$ 2), SnO and the like. Polymers used in any or all of the anode, cathode and separator as binders, include Polyethylene oxide (PEO), Polyurethane, Polyacrylonitrile (PAN), Polymethylmethacrylate (PMMA), etc.

Cathode compositions preferably comprise from about 5 to about 80 weight % of dry PVdF-HFP, more preferably about 10 to about 60 weight %, and most preferably about 10 to about 35 weight % PVdF-HFP.

The substantially insoluble lithium compound present in the cell is preferably at least on the order of the amount of the soluble electrolyte salt and is at least preferably present in an amount of from about 1 to about 80 dry weight % of the PVdF-MFP in the cathode, more preferably from about 1 to about 50 weight percent, and most preferably in significant amounts from about 10 to about 35 dry weight % of the active cathode material.

The following comparative examples serve to illustrate the efficacy of the substantially insoluble lithium compound additions in the cells of the present invention. The examples should not however be construed as limiting the invention. The following examples relate to testing of cells in which the cathode and either or both the anode and polymeric separator have been formed with addition of the substantially insoluble lithium compounds therein.

A comparison of cells with and without lithium compound inclusion was made. The results are shown in Examples 1–5. It was observed that a significantly improved cell performance was obtained for those cells containing the substantially insoluble lithium compound additions dispersed in the components thereof in comparison to the standard cells without lithium compound inclusions. The improvements in cell performance relate to recyclability, discharge capacity and high temperature storage stability and discharge under high temperature conditions. The folowing examples illustrate the marked improvements obtained.

EXAMPLE 1

Effect of $Li_2CO_3$ inclusions in full cell (cathode, anode and separator) -Fabrication of $Li_2CO_3$ containing polymer lithium ion cells Cells were prepared with the following relative percentages of components with the substantially insoluble lithium carbonate being added to both electrodes and the separator, as given in Table 1.

TABLE 1

The formulations of anode, cathode and separator listed as weight percentages of dry materials.

| Component | Anode (A) | Cathode (C) | Separator (S) |
|---|---|---|---|
| PVdF-HFP | 15.7 | 12.2 | 33.4 |
| Carbon black | 2.9 | 5.0 | — |
| Plasticizer** | 24.6 | 16.1 | 44.5 |
| $LiMn_2O_4$ | — | 64.7 | — |
| Carbon | 55.1 | — | — |
| Conductive filler* | — | — | 12.2 |
| $Li_2CO_3$ | 1.6 | 2.0 | 9.9 |

*fumed silica or alumina
**dibutyl phthalate (DBP)

EXAMPLE 2

Shelf-life

Figure 1:
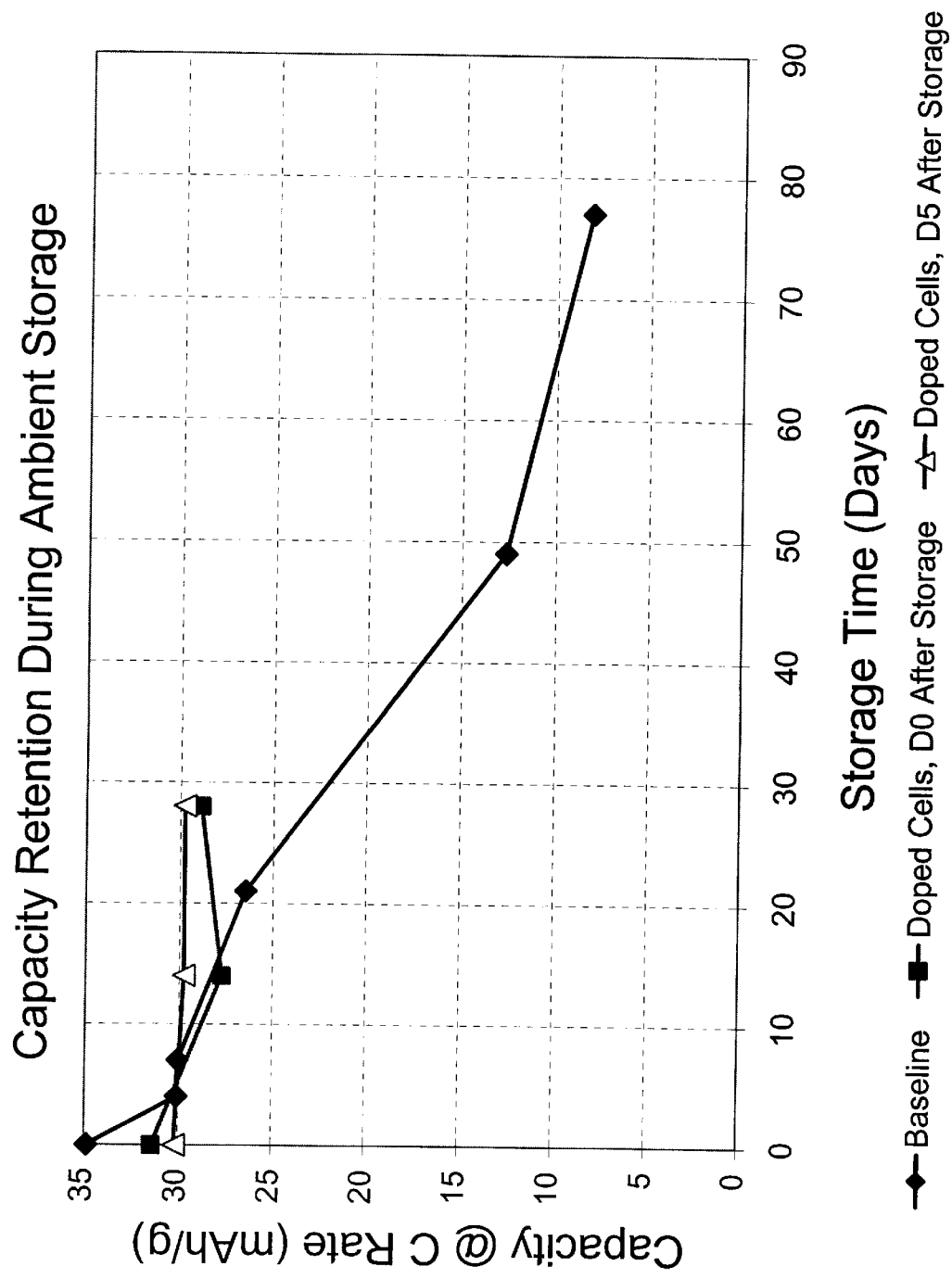
Figure 2:
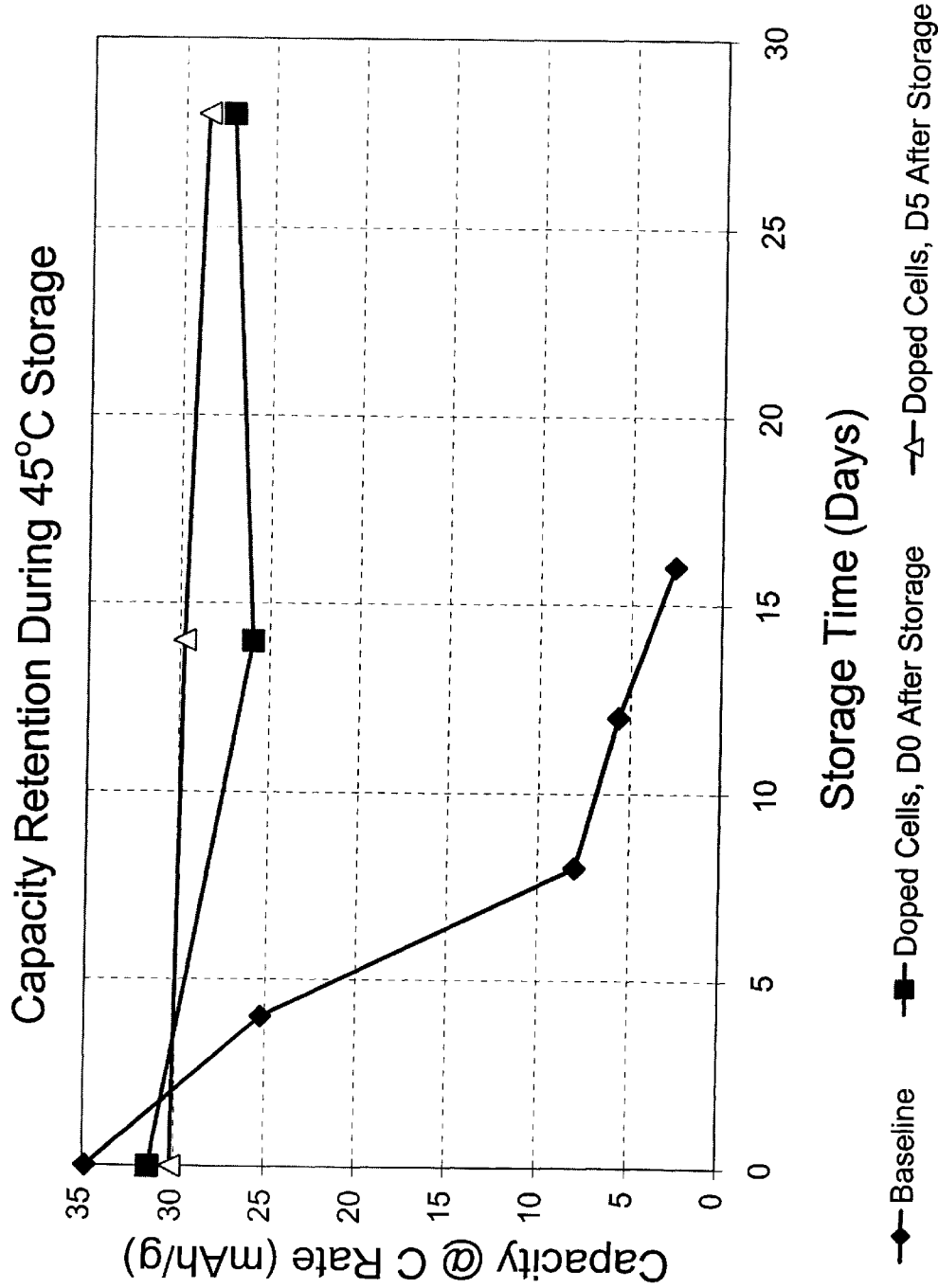

Storage characteristics of cells containing the substantially insoluble lithium compound, at both room and high temperatures (23 and 45° C.) were investigated with discharge results shown in FIGS. 1 and 2. The baseline points in the figures represent a capacity per cell weight for 72 groups of standard cells (with no compound inclusion), with each group comprising at least 40 cells. It was determined that standard cells lose about 20% of their capacity after being stored at room temperature for 2 weeks, while those cells with $Li_2CO_3$ inclusion retain nearly all of their capacity after 4 weeks of storage time. The capacity for the standard cells deteriorates much faster on 45° C. storage—a capacity loss of 80% was observed after only 8 days of storage time. In contrast, the same cells with full cell (cathode, anode and separator) lithium compound inclusion after a standing period of 5 weeks retain approximately 92% of their capacity).

EXAMPLE 3

Internal Cell Impedance Growth

Figure 3:
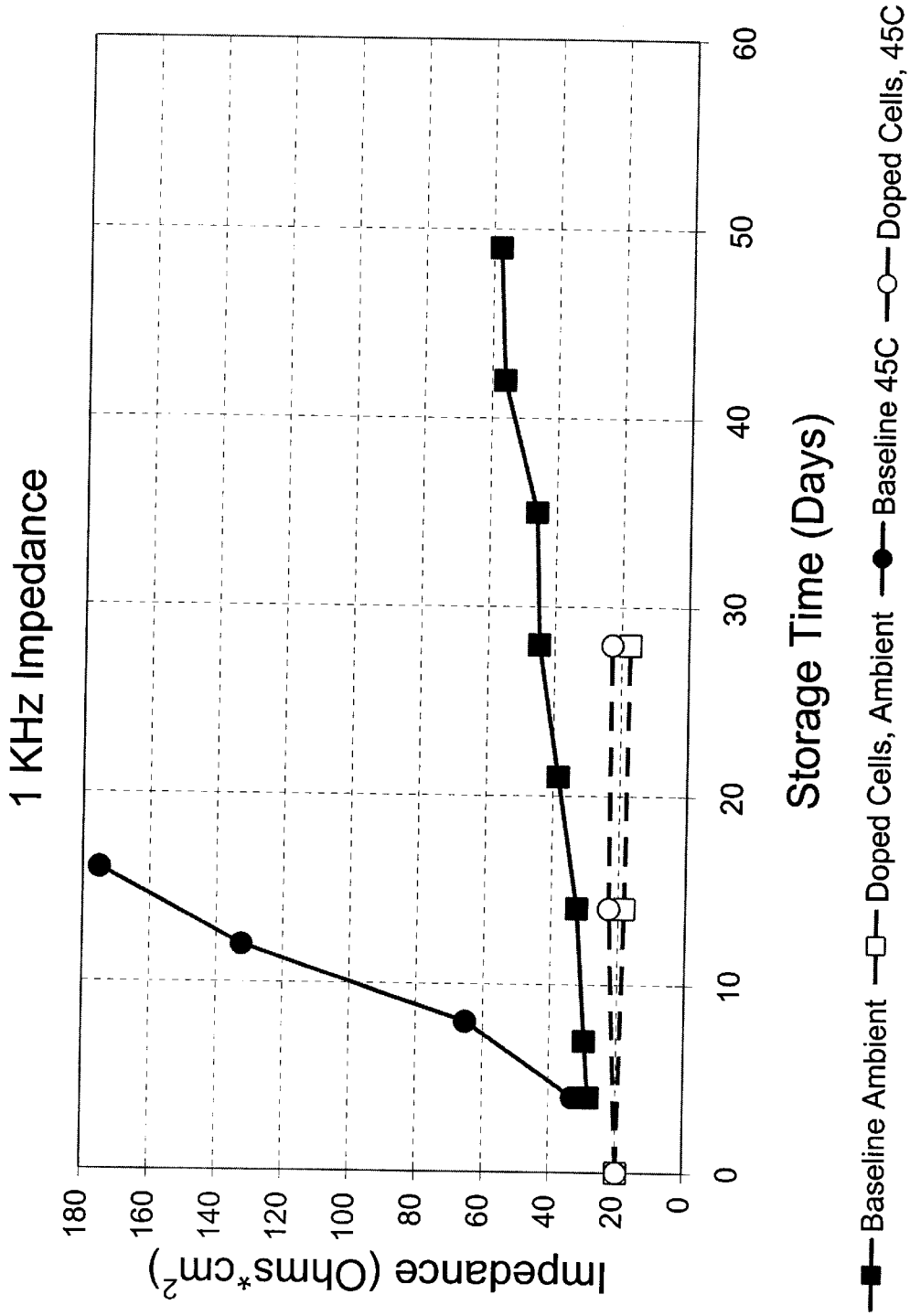

Reduction of impedance growth of substantially insoluble lithium compound containing cells, in comparison with cells not containing the substantially insoluble compounds, is also substantial. FIG. 3 shows a comparison of impedance in substantially insoluble compound containing lithium cells and and the cells without inclusions, at both room temperature and 45° C.

EXAMPLE 4

Cycle Life

Figure 4:
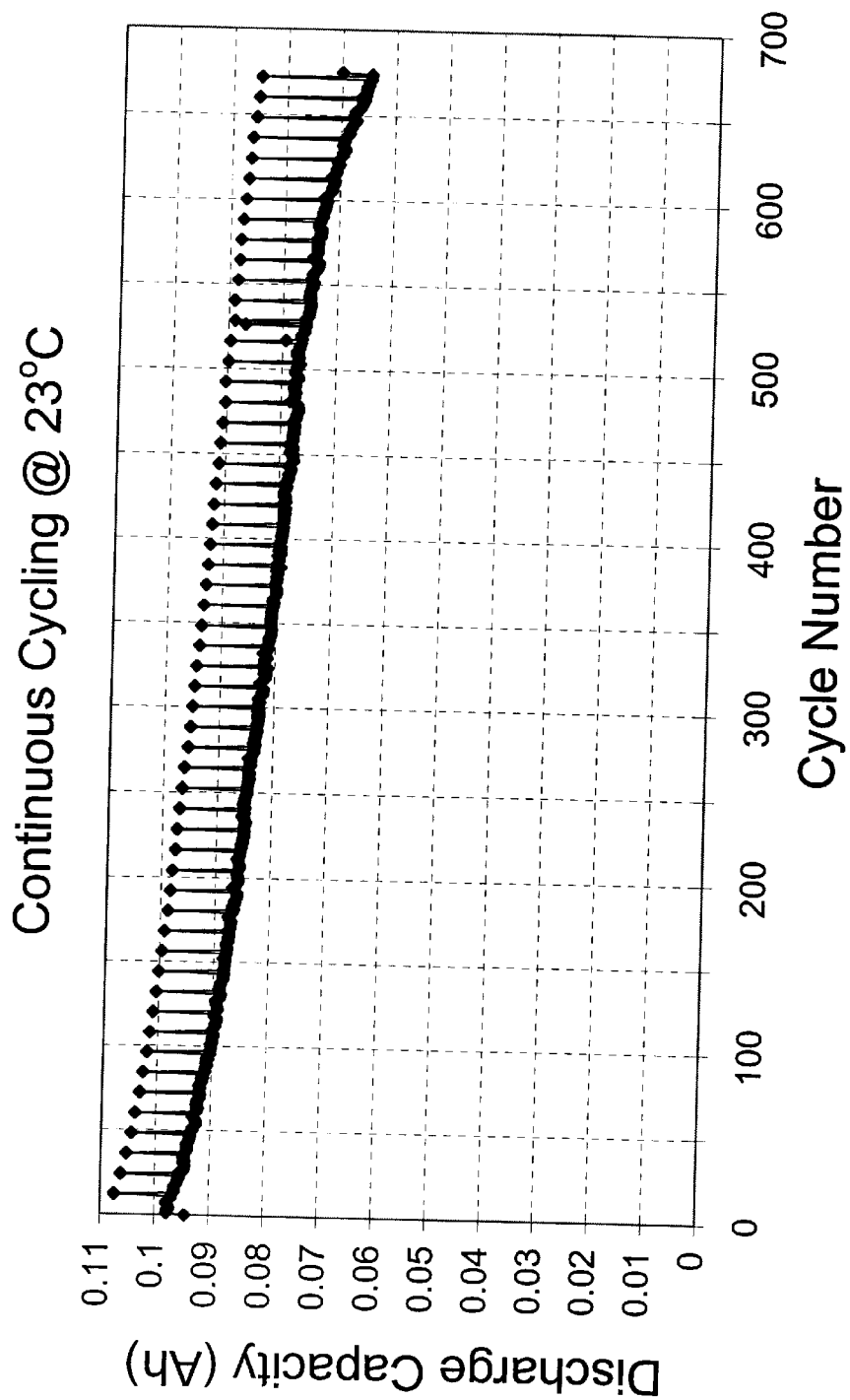
FIG. 4 is a graph of the discharge capacity versus cycle number of a $Li_2CO_3$-containing polymer lithium ion cell. Data is obtained from C-rate with continuous cycling at room temperature with C/5 cycle every twelve C-rate cycles in order to observe any loss in rate capability. (C-rate is the discharge or charge current in amperes, expressed as a multiple of the rated capacity in ampere-hours).

Polymer lithium ion cells without lithium compound inclusion failed after about 200 continuous C-rate (charge or discharge the cell within 1 hour) cycling at room temperature. The cells with $Li_2CO_3$ inclusion in anode, separator and cathode (full cell inclusion) showed about 3-fold improvement in terms of cycle life. FIG. 4 shows that a cell completed more than 600 cycles at C-rate (with a C/5 rate cycle every 12 cycles) before a reduction of rate capability below 70% of rated capacity appeared.

EXAMPLE 5

$Li_2CO_3$ Cross Inclusion Formulations $Li_2CO_3$ was selectively included in the various cell components of anode, cathode, and separator and these components were assembled into solid state polymer cells in a variety of combinations as shown in the following table. The relative inclusion amounts (when present) were the same as for the cells described in Example 1.

TABLE 2

| | $Li_2CO_3$ cross inclusions | | | |
|---|---|---|---|---|
| Cell components | Anode | Separator | Cathode | Formula code |
| Formulation 1 | 0 | 0 | 0 | std |
| Formulation 2 | X | 0 | 0 | A |
| Formulation 3 | 0 | 0 | X | C |
| Formulation 4 | X | 0 | X | A + C |
| Formulation 5 | 0 | X | X | S + C |
| Formulation 6 | X | X | X | A + S + C |
| Formulation 7 | X | X | 0 | A + S |

0 means no lithium compound inclusion in that cell component.
X means compound inclusion present in the cell component.

Figure 5:
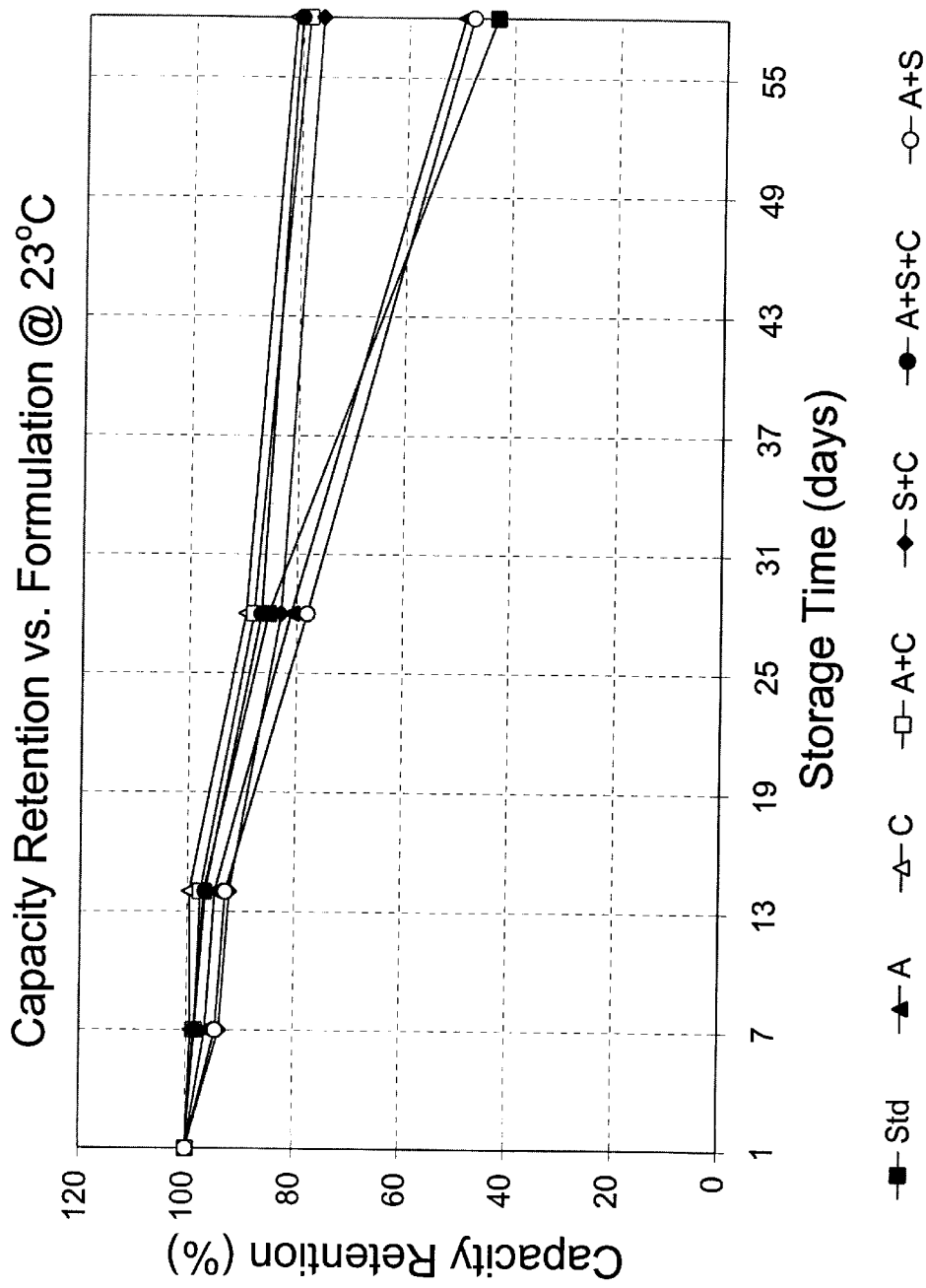
FIG. 5 is a graph of the comparative retained discharge capacity versus storage time at room temperature for cells with $Li_2CO_3$ inclusions in various cell components. (See Table 2 notation).

The results of Table 2 are illustrated in FIGS. 5–8. In FIG. 5, at 23° C., the worst performers were the standard cells without substantially insoluble lithium compound inclusion and with compound inclusion only at anode or anode plus separator (i.e., the inclusions as effected in the prior art).

Figure 6:
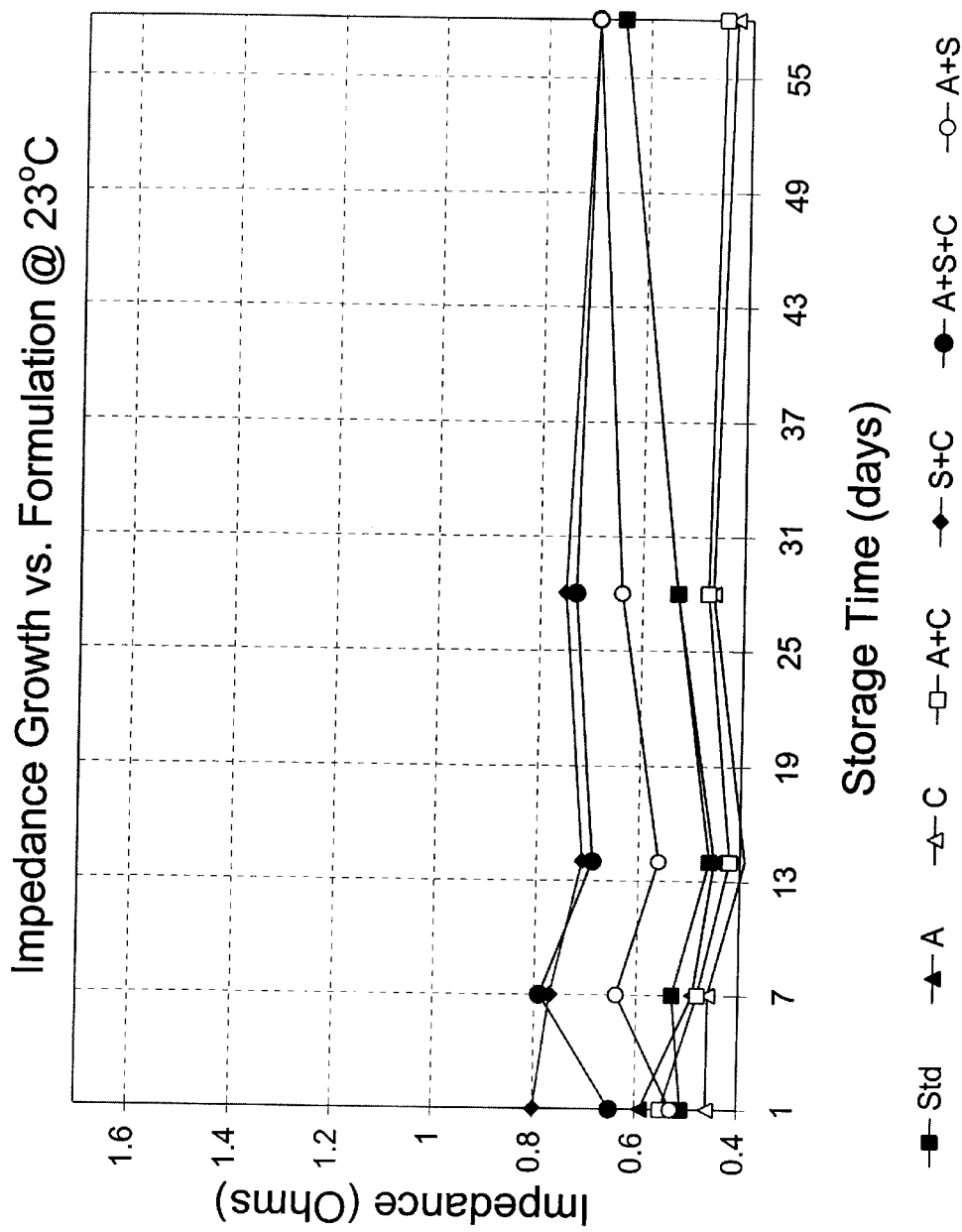
FIG. 6 is a graph of the comparative impedance at 1 kHz versus storage time at room temperature for cells with $Li_2CO_3$ inclusions in various cell components.

With respect to FIG. 6, the cells with substantially insoluble lithium compound-containing cathodes showed enhanced storage characteristics. However, impedance increase at room temperature storage was not significant for all the cells after a two month storage.

Figure 7:
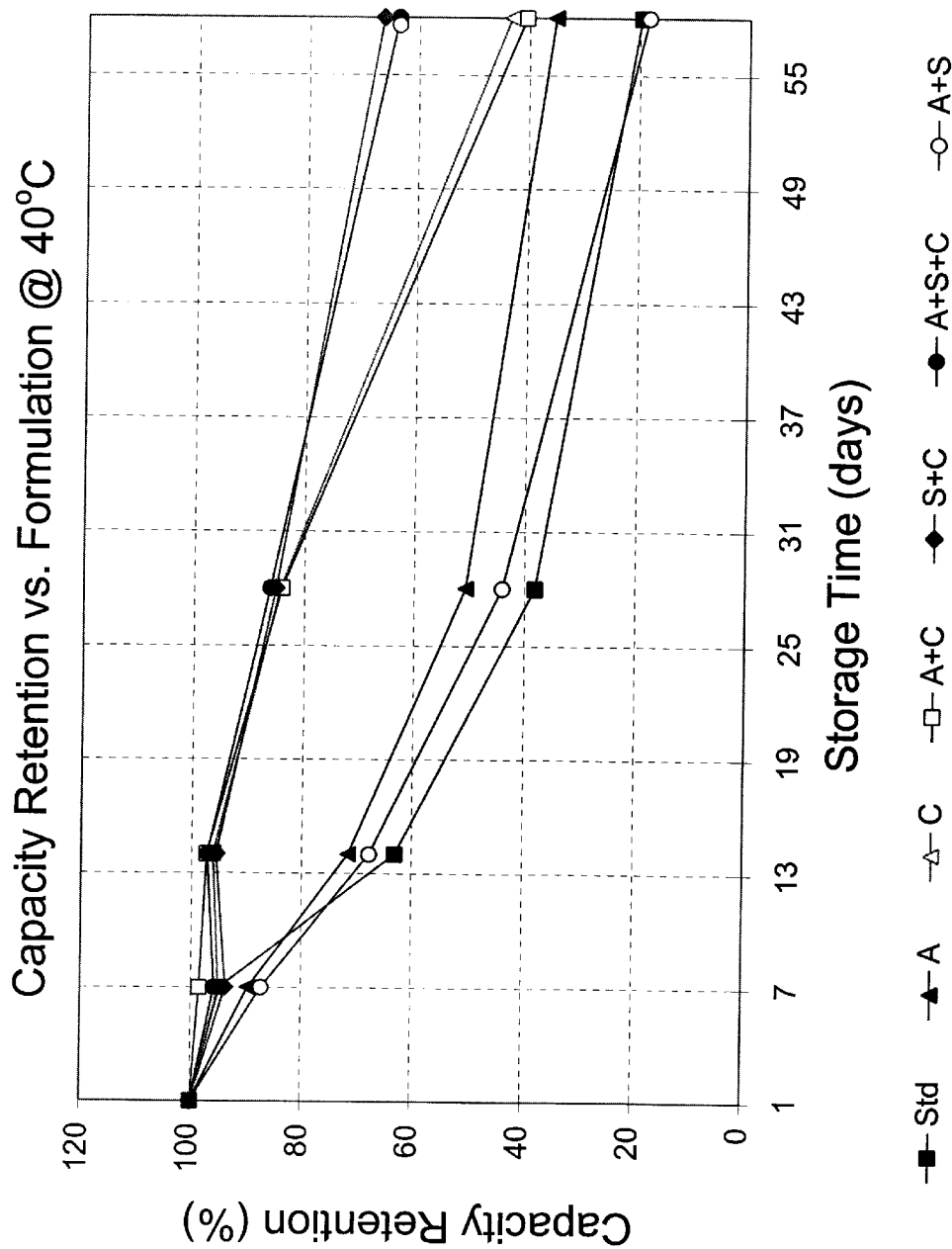
FIG. 7 is a graph of the retained discharge capacity versus storage time at 45° C. for cells with $Li_2CO_3$ inclusion in various cell components.
Figure 8:
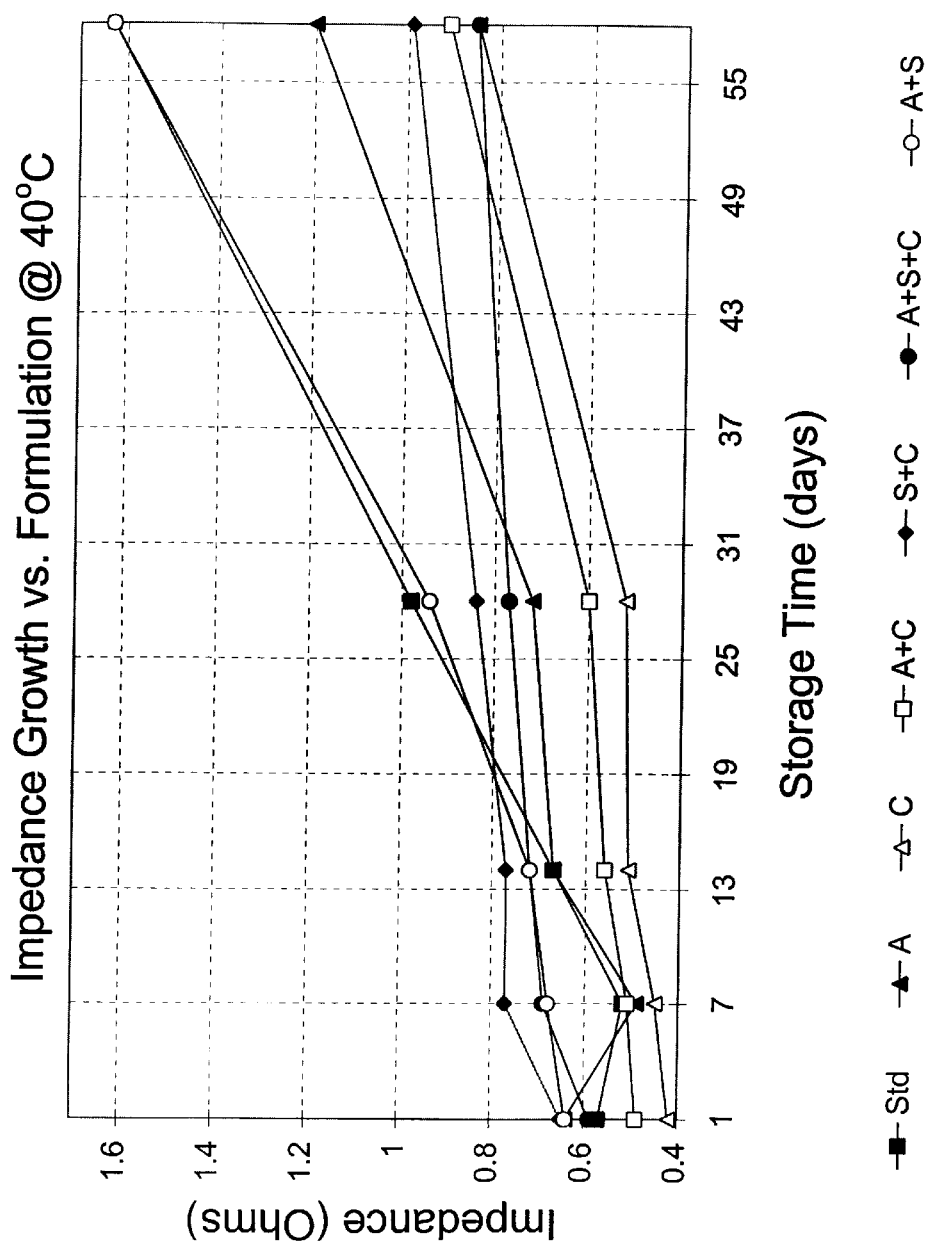
FIG. 8 is a graph of the impedance at 1 kHz versus storage time at 45° C. for cells with $Li_2CO_3$ inclusion in various cell components.

With respect to FIG. 7, cells similar to those used with respect to FIG. 6 as described above were made, stored and tested. At 40° C., the cells without compound inclusion in the cathode performed poorly. In FIG. 8, for the cells at 40° C., impedance growth was most significant for the standard cells without compound inclusion and for cells with inclusions only in the anode and separator.

EXAMPLE 6

Lithium Compound Inclusion Level

Various levels (0, 5, 10, 25, 50, 80%) of $Li_2CO_3$ inclusion were attempted in the solid state polymer cells using Formulation 4 (A+C) of Example 5. The percentages of $Li_2CO_3$ inclusion levels in cell components were calculated against the dry weight of PVdF-HFP copolymer.

Figure 9:
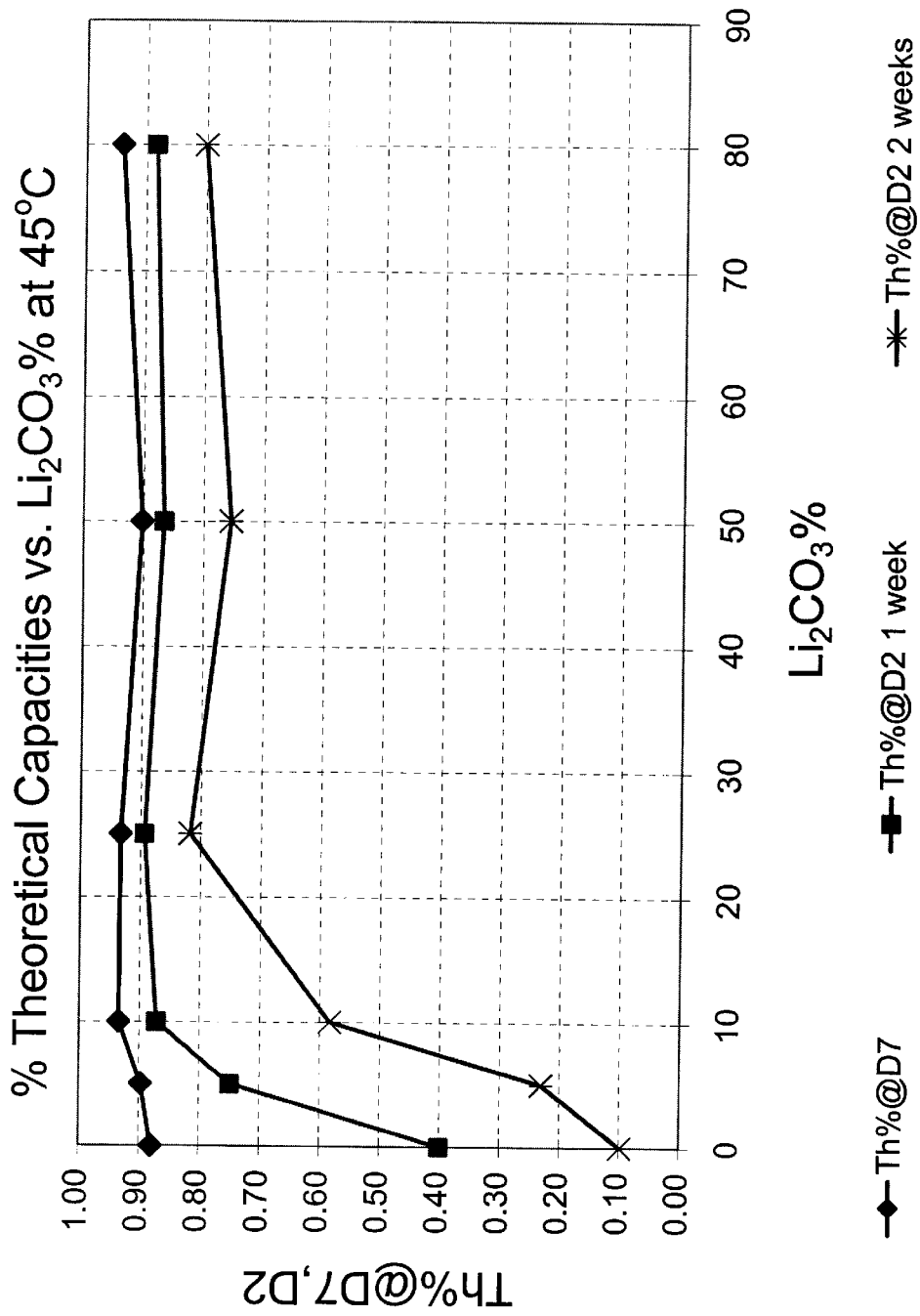
FIG. 9 is a graph of the percent (%) theoretical discharge capacity of cells after each 45° C. storage period versus various $Li_2CO_3$ inclusion levels.
Figure 10:
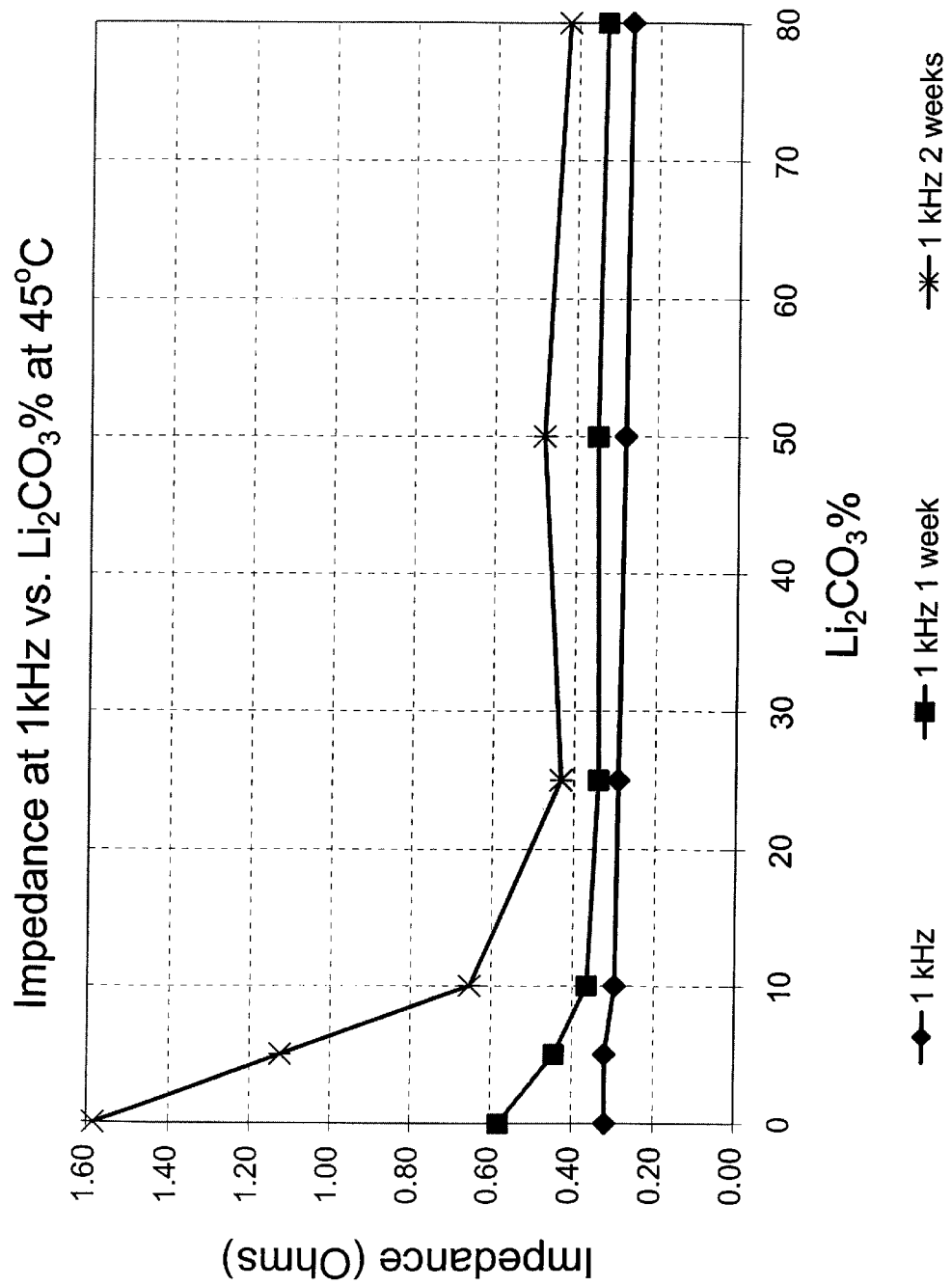
FIG. 10 is a graph of the impedance at 1 kHz of cells after each 45° C. storage period versus various $Li_2CO_3$ inclusion levels.
Figure 11A:
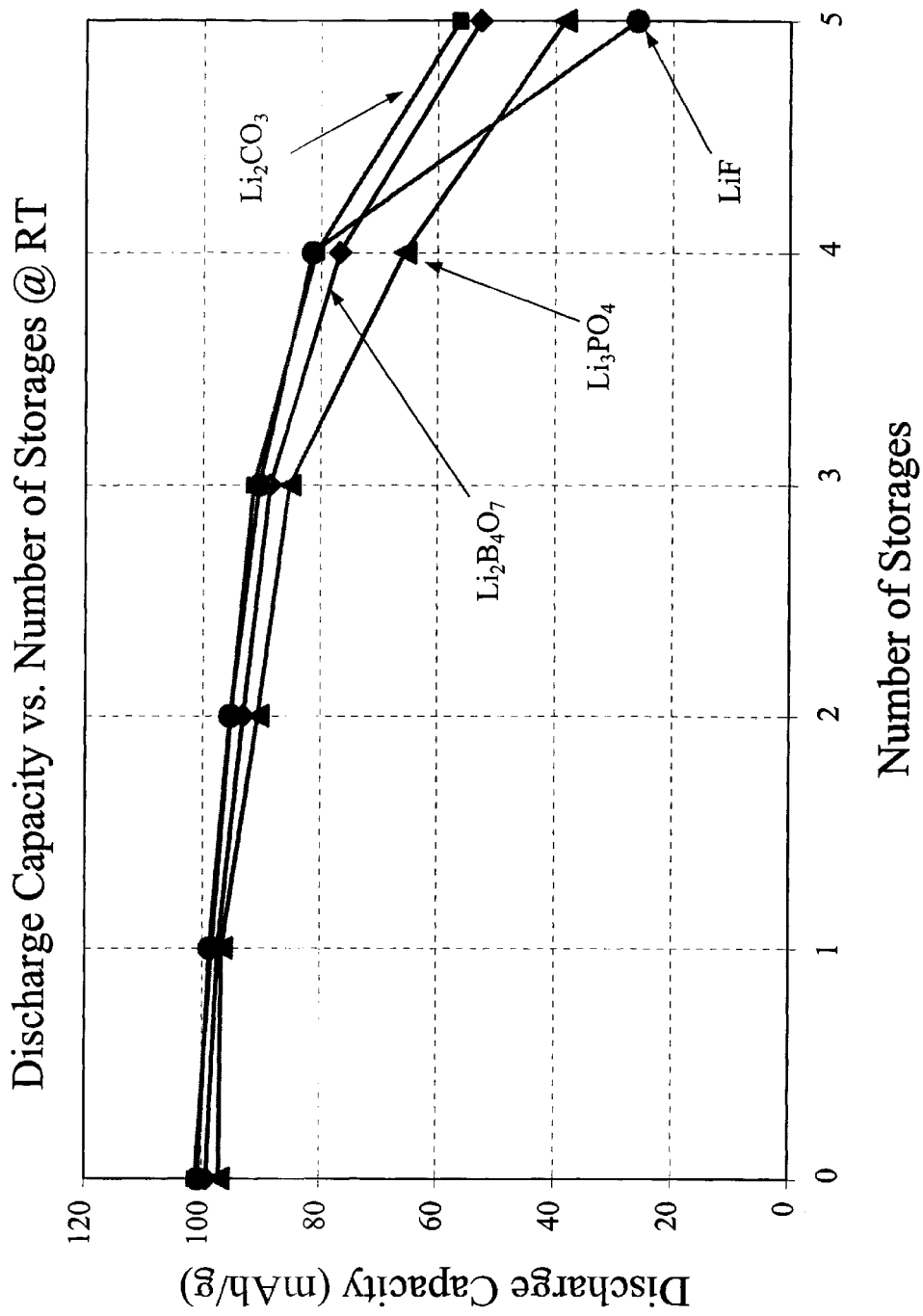
Figure 11B:
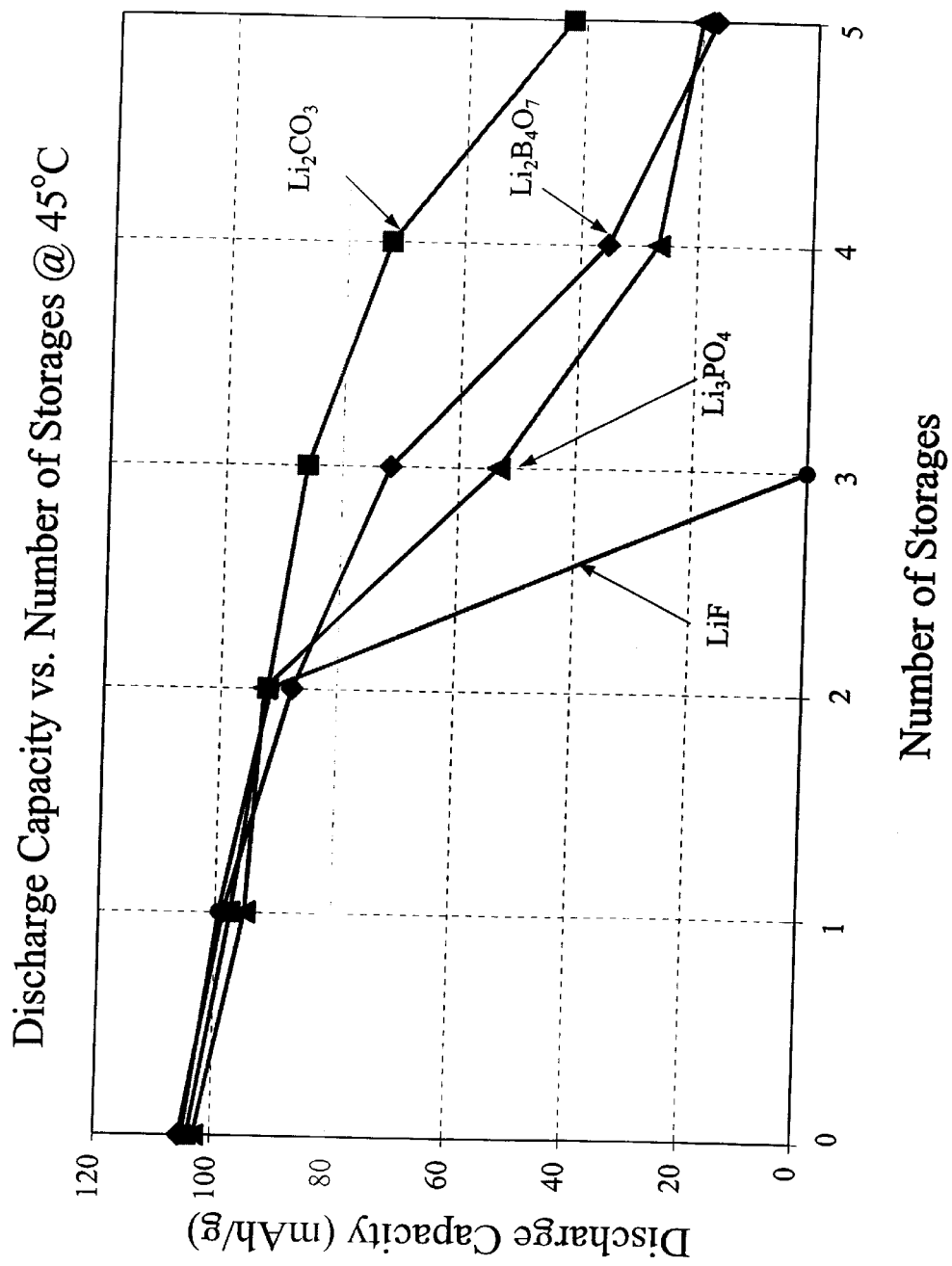
Figure 11C:
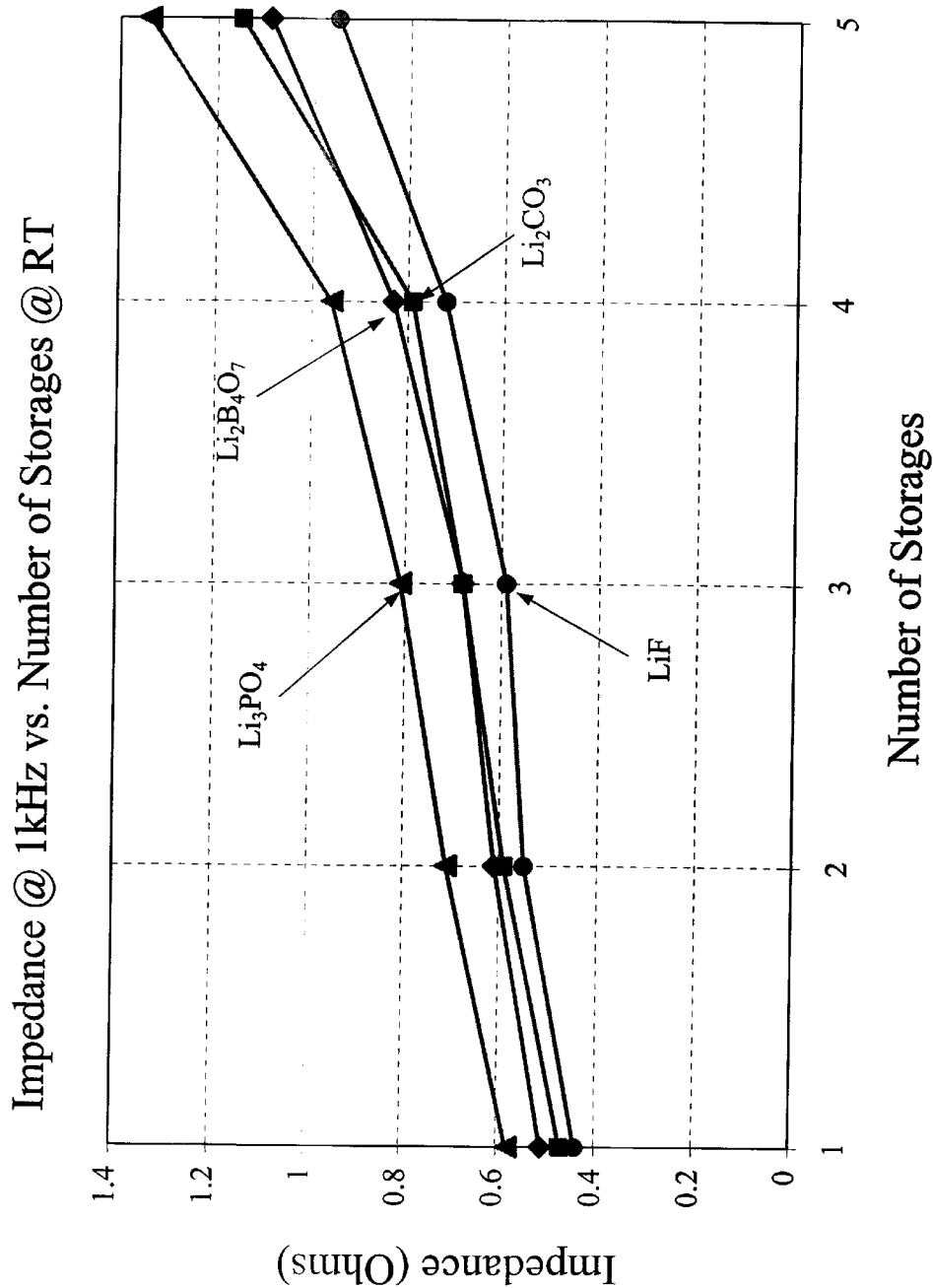
Figure 11D:
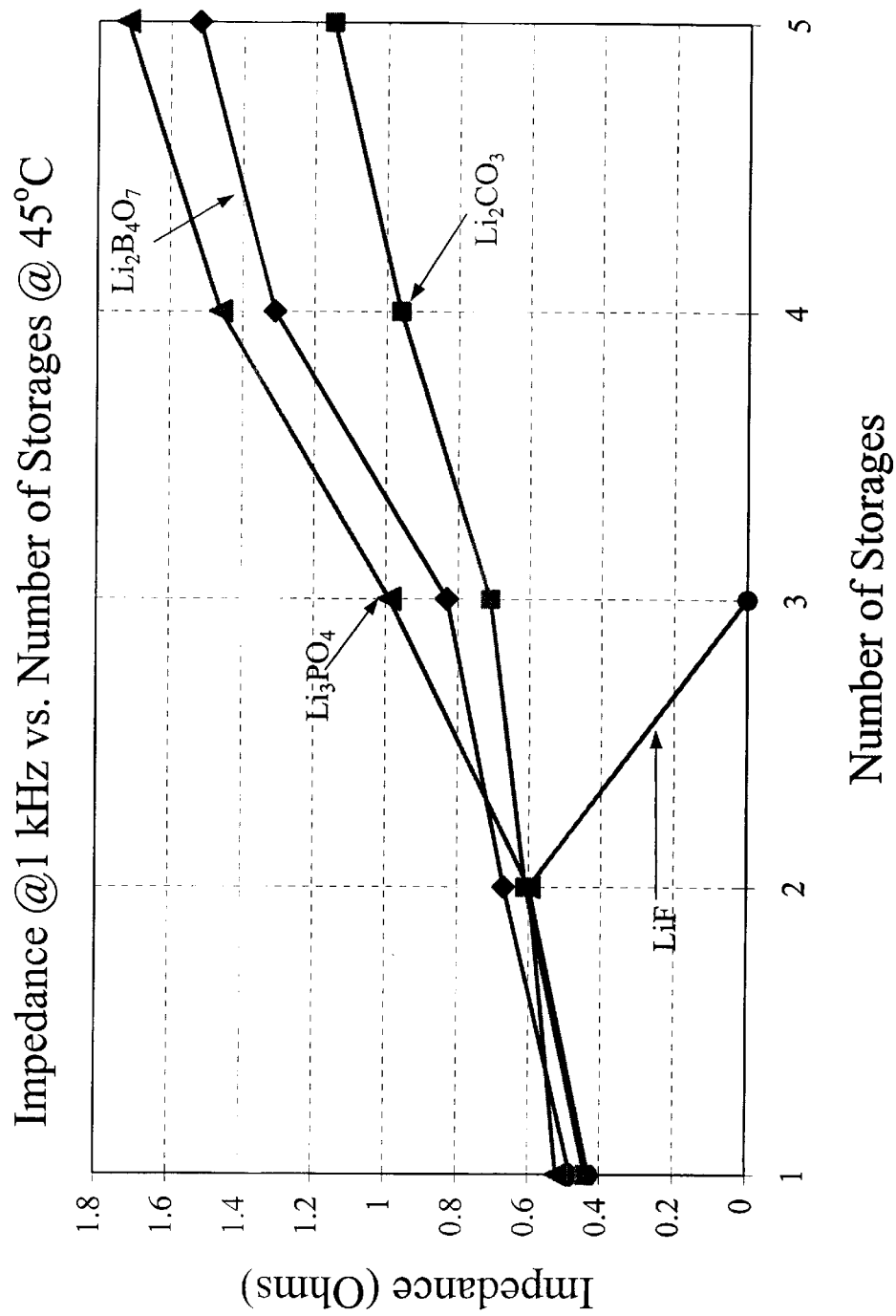

Results of $Li_2CO_3$ inclusion level versus retained capacity after two storage periods at 45° C. are shown as plotted in FIGS. 9 and 10. A $Li_2CO_3$ inclusion level of 10% or higher is preferred to achieve a desired high ($\geq 80\%$) capacity retention. Thus, lower scavenging level amounts of $Li_2CO_3$ do not exhibit the advantages of the present invention.

EXAMPLE 7

Inclusion of $Li_2B_4O_7$ in Cell Cathode

Lithium ion polymer cells with similar component inclusions of other non-soluble lithium compounds of $Li_2B_4O_7$, $Li_3PO_4$ and LiF respectively in the separator alone were compared to that of $Li_2CO_3$, as shown in FIGS. 11a–d with somewhat comparable results, particularly for the former two compounds, and such compounds if included to the cathodes of cells tend to exhibit improvement in high temperature storage, recycling capability and discharge capability as compared to cells without such inclusions. Thus, lithium ion cells with $Li_2B_4O_7$ included in the cathode material were compared to standard cells, without such inclusion, under storage conditions of 45° C. All the compared cells contained cathodes with 158.4 gm of active manganese oxide material, 30 grams of PVdF-HFP polymer, 12.2 gms of carbon black and 39.4 grams of DBP filler material. One set of cells additionally contained 5 gm of contained $Li_2B_4O_7$ in the cathodes thereof. Initial discharge capacities were about the same. However, after seven days there was about a 20% improvement in % theoretical discharge capacity with use of the additive and after 14 days this improvement increased to about a 25% improvement, as shown in FIG. 12. It is accordingly expected that other substantially insoluble lithium compounds and particularly oxygen containing compounds will provide the cycling and high temperature improvements when added in substantial amounts to the cathodes of lithium ion cells.

It is understood that the above description of preferred embodiments is only illustrative of the present invention and that changes may be made in cell structure, components and operation as well as modifications in the nature, amount and distribution of the substantially insoluble lithium compounds of the present invention without departing from the scope of the present invention as defined in the following claims.

What is claimed:

1. A non-aqueous rechargeable electrochemical cell comprising an anode, a cathode and a polymeric separator therebetween, with a non-aqueous electrolyte, comprising an electrolyte salt dissolved in a solvent therefor, being in contact with said anode, cathode and separator, wherein the anode and cathode comprise different intercalation compounds for host containment and release of lithium ions, characterized in that a non-cathode active lithium compound containing one or more non-metallic elements, substantially insoluble in the non-aqueous electrolyte of said cell, is dispersed throughout the cathode; wherein the substantially insoluble lithium compound is further dispersed within at least one of the anode and separator.

2. A non-aqueous rechargeable electrochemical cell comprising an anode, a cathode and a polymeric separator therebetween, with a non-aqueous electrolyte, comprising an electrolyte salt dissolved in a solvent therefore, being in contact with said anode, cathode and separator, wherein the anode and cathode comprise different intercalation compounds for host containment and release of lithium ions, characterized in that a non-cathode active lithium compound containing one or more non-metallic elements, substantially insoluble in the non-aqueous electrolyte of said cell, is dispersed throughout the cathode; wherein the cell is a solid polymer cell wherein the non-aqueous electrolyte is immovably contained within a porous polymeric separator; wherein the substantially insoluble lithium compound is substantially uniformly dispersed in the cathode and at least one of the anode and separator.

3. The non-aqueous cell according to claim 1, wherein the substantially insoluble lithium-containing compound is selected from the group consisting of $Li_2CO_3$, $Li_2C_2O_4$, $Li_2B_4O_7$, $LiB_3O_5$, $LiB_8O_{13}$, $LiBO_2$, $Li_4B_2O_5$, $Li_3BO_3$, $Li_2B_2O_4$, $Li_2B_6O_{10}$, $Li_3PO_4$, $LiPO_3$, $Li_4P_2O_7$, $LiP$, $Li_3P$, $Li_3N$, $Li_2O$, $LiSiO_3$, $Li_4SiO_4$, $Li_2Si_3O_7$, $Li_2Si_2O_5$, $Li_{13}Si_4$, $Li_{21}Si_8$, LiF, LiCl, LiBr, LiI, $Li_2SeO_4$, $Li_2Se$, $Li_2SO_3$, $Li_2SO_4$, $Li_2S_2O_6$, and $Li_2S_2O$.

4. The non-aqueous cell of claim 2, wherein the substantially insoluble lithium compound is selected from the group consisting of lithium oxides, lithium halides, and lithium compounds containing oxygen and a third non-metallic element.

5. The non-aqueous cell according to claim 1, wherein the electrolyte comprises a soluble lithium salt dissolved in a mixture of ethylene carbonate and dimethyl carbonate.

6. The non-aqueous cell according to claim 2, wherein the electrolyte salt is selected from the group consisting of $LiPF_6$, $LiBF_4$, $LiClO_4$, $LiCF_3SO_3$, $LiN(CF_3SO_3)_3$, $LiAsF_6$, and $LiN(C_2F_5SO_2)_3$.

7. The non-aqueous cell according to claim 1, wherein the cathode comprises a lithium manganese oxide intercalation compound.

8. The non-aqueous cell according to claim 1, wherein the cathode comprises $Li_{1+x}Mn_{2-y}O_4$ ($0 \leq x \leq 0.2$, $0 \leq y \leq 0.2$).

9. The non-aqueous cell according to claim 1, wherein the cathode comprises poly(vinylidene fluoride)-hexafluoropropylene (PVdF-HFP) and wherein the substantially insoluble lithium compound comprises from about 1 to about 80% by dry weight of PVdF-HFP in the cathode.

10. The non-aqueous cell according to claim 9, wherein the cathode comprises the insoluble lithium compound in an amount of from about 1 to about 50% by dry weight of PVdF-HFP in the cathode.

11. The non-aqueous cell according to claim 10, wherein the cathode comprises the insoluble lithium compound in an amount of from about 10 to about 35% dry weight of PVdF-HFP in the cathode.

12. The non-aqueous cell according to claim 3 wherein the insoluble lithium-containing compound is selected from the group consisting from $Li_2CO_3$, LiF, $Li_2B_4O_7$, and $Li_3PO_3$.

13. The non-aqueous cell according to claim 12 wherein the insoluble lithium-containing compound is $Li_2CO_3$.

14. The non-aqueous cell according to claim 12 wherein the insoluble lithium-containing compound is $Li_2B_4O_7$.

15. A rechargeable cell comprising:

an anode comprising a lithium intercalating material and a non-aqueous lithium ion conducting electrolyte;

a cathode comprising, a lithium intercalating manganese oxide, a non-aqueous lithium ion conducting electrolyte and at least one substantially insoluble lithium compound selected from the group consisting of $Li_2CO_3$, LiF, $Li_2B_4O_7$, and $Li_3PO_4$; and a polymeric separator containing a non-aqueous lithium ion conducting electrolyte; wherein at least one of the anode and separator comprise at least one substantially insoluble lithium compound selected from the group consisting of $Li_2CO_3$, LiF, $Li_2B_4O_7$, and $Li_3PO_4$.

16. The non-aqueous cell of claim 2, wherein the amount of substantially insoluble lithium compound present in the cell is at least on the order of the amount of electrolyte salt present in the non-aqueous electrolyte.

* * * * *